United States Patent Office.

DAVID R. P HILL, OF MORGANTOWN, WEST VIRGINIA.

Letters Patent No. 82,523, dated September 29, 1868.

IMPROVED PAINT-OIL.

The Schedule referred to in these Letters Patent and making part of the same.

TO ALL WHOM IT MAY CONCERN:

Be it known that I, DAVID R. P. HILL, of Morgantown, in the county of Monongalia, and State of West Virginia, have invented a new and improved Paint-Oil; and I do hereby declare that the following is a full, clear, and exact description thereof, which will enable others skilled in the art to make and use the same.

My invention has for its object to furnish an improved paint-oil, prepared from petroleum-oil, for inside and outside painting, which will dry sooner than other oils, and when dry will make a fine gloss, will be harder, and more substantial, which shall have a splendid body, working easier and flowing more freely from the brush than other oils.

And it consists in the paint-oil formed of the ingredients combined with each other in the proportions and manner hereinafter more fully described.

In preparing this oil, I first pulverize twenty pounds of rosin and one-half pound of sugar of lead, and mix with them one pound of sulphate of zinc; I then add ten gallons of petroleum-oil, and bring the mixture to a boil; I then slake one pound of lime, and mix with it one gallon of linseed-oil, and add the mixture to the mixture first prepared.

This causes all impurities to rise to the surface, so that they may be skimmed off.

I then add two ounces of glue, boil rapidly for one hour, and add two ounces of concentrated lye and one quart of turpentine.

When cold, I add one-half ounce of creosote, and the preparation of the oil is completed.

It should be observed that the creosote is used for destroying the odor of the petroleum.

Having thus described my invention, I claim as new, and desire to secure by Letters Patent—

An improved paint-oil, prepared of the ingredients, in the proportions and manner substantially as herein described and set forth.

The above specification of my invention signed by me, this 25th day of July, 1868.

DAVID R. P. HILL.

Witnesses:
J. J. FITCH,
GEORGE HALL.